US010893466B2

(12) United States Patent
Ryan et al.

(10) Patent No.: US 10,893,466 B2
(45) Date of Patent: Jan. 12, 2021

(54) ROGUE BASE STATION ROUTER DETECTION WITH STATISTICAL ALGORITHMS

(71) Applicant: LGS Innovations LLC, Herndon, VA (US)

(72) Inventors: Jennifer Lynn Ryan, Golden, CO (US); Ronald Lance Justin, Denver, CO (US); Kerri Ann Stone, Lafayette, CO (US)

(*) Notice: Subject to any disclaimer, the term of this patent is extended or adjusted under 35 U.S.C. 154(b) by 311 days.

(21) Appl. No.: 16/029,145

(22) Filed: Jul. 6, 2018

(65) Prior Publication Data

US 2019/0132787 A1  May 2, 2019

Related U.S. Application Data

(60) Provisional application No. 62/578,010, filed on Oct. 27, 2017, provisional application No. 62/578,016, (Continued)

(51) Int. Cl.
*H04W 48/16* (2009.01)
*H04W 12/12* (2009.01)
(Continued)

(52) U.S. Cl.
CPC ............ *H04W 48/16* (2013.01); *G06F 3/02* (2013.01); *G06K 9/6219* (2013.01); (Continued)

(58) Field of Classification Search
CPC ... H04W 48/16; H04W 24/08; H04W 84/042; H04W 12/1202; H04W 12/12; (Continued)

(56) References Cited

U.S. PATENT DOCUMENTS 9,049,602 B2  6/2015  Walby et al.
9,723,017 B1 *  8/2017  Pandey .............. H04L 63/1408
(Continued)

*Primary Examiner* — Christopher C Harris
(74) *Attorney, Agent, or Firm* — Baker & Hostetler LLP

(57) ABSTRACT

The patent application is directed to a method for detecting a rogue device in a network including the step of providing an algorithm including predetermined criteria, executed by a processor, for identifying the rogue device. The method also includes a step of performing a cellular scan across the network. The method also includes a step of receiving, from the cellular scan, survey data including information of plural devices associated with the predetermined criteria. The method further includes a step of displaying, via a graphical user, a distribution curve including a calculated mean and a standard deviation based on the survey data for the predetermined criteria. The method also includes a step of comparing the information of one of the plural devices with statistically-calculated distribution curves. The method further includes a step of determining the compared information of the one device exceeds a predetermined threshold of standard deviations from a calculated mean and calculating a confidence level that the one device is a rogue device. The application is also directed to a system for testing and determining if a cellular attack on a communication system is active.

13 Claims, 16 Drawing Sheets

Related U.S. Application Data filed on Oct. 27, 2017, provisional application No. 62/578,021, filed on Oct. 27, 2017.

(51) Int. Cl.

| | | |
|---|---|---|
| *H04W 68/00* | (2009.01) | |
| *H04W 24/08* | (2009.01) | |
| *G06N 20/00* | (2019.01) | |
| *G06F 3/02* | (2006.01) | |
| *G06K 9/62* | (2006.01) | |
| *H04L 29/06* | (2006.01) | |
| *H04L 12/24* | (2006.01) | |
| *H04W 84/04* | (2009.01) | |
| *H04L 12/26* | (2006.01) | |
| *H04W 88/08* | (2009.01) | |

(52) U.S. Cl.
CPC ........... *G06K 9/6223* (2013.01); *G06N 20/00* (2019.01); *H04L 63/1425* (2013.01); *H04L 63/1483* (2013.01); *H04W 12/12* (2013.01); *H04W 24/08* (2013.01); *H04W 68/005* (2013.01); *H04L 41/22* (2013.01); *H04L 43/045* (2013.01); *H04L 43/16* (2013.01); *H04W 84/042* (2013.01); *H04W 88/08* (2013.01)

(58) Field of Classification Search
CPC ....... H04W 68/005; H04W 88/08; G06F 3/02; G06K 9/6219; G06K 9/6223; H04L 63/1425; H04L 63/1483; H04L 43/045; H04L 43/16; H04L 41/22; G06N 5/003; G06N 20/10; G06N 3/08; G06N 20/20; G06N 20/00

See application file for complete search history.

(56) References Cited

U.S. PATENT DOCUMENTS

| | | | |
|---|---|---|---|
| 2003/0145232 A1* | 7/2003 | Poletto | H04L 63/1408 726/22 |
| 2007/0079376 A1* | 4/2007 | Robert | H04W 12/1202 726/23 |
| 2012/0027064 A1 | 2/2012 | Gupta et al. | |
| 2016/0286410 A1 | 9/2016 | O'Malley | |
| 2016/0309332 A1 | 10/2016 | Norrman et al. | |
| 2017/0150426 A1 | 5/2017 | Goldfarb | |
| 2017/0295489 A1 | 10/2017 | Agiwal et al. | |
| 2018/0070228 A1 | 3/2018 | Goldfarb | |
| 2018/0337935 A1* | 11/2018 | Marwah | H04L 63/1425 |
| 2018/0351975 A1 | 12/2018 | Briggs et al. | |
| 2018/0367303 A1 | 12/2018 | Velev et al. | |
| 2018/0367998 A1 | 12/2018 | Kunz et al. | |

* cited by examiner

| ≡ BITS | | | | | | |
|---|---|---|---|---|---|---|
| ※ ROGUE BSR | DETECTION LOGS | | | | | NOTIFICATIONS |
| ≡ ANOMALOUS CELLS | | | | | | ⊖ DETECTION_DEVICE_0 DETECTED ROGUE BSR – GSM  30M × |
| ⤳ SETTINGS | CONFIDENCE | ⇕ GCI | ⇕ RAT | TRIGGERS | CHANNEL/ CODE ⇕ | SIGNAL STRENGTH (dBm) | ROGUE BSR   SEE ALL ACTIVITY |
| ⚙ DEVELOPER SETTING | ☐ 30% | 310410381313412 | LTE | LTE, ML | 2425 / 264 | -49 | 2 HOURS |
| | ☐ 30% | 310260110283936 | GSM | PROCEDURAL | 613 / 18 | -86 | 12 MINUTES |
| | ☐ 100% | 310260110282016 | GSM | PROCEDURAL, STATISTICAL | 612 / 62 | -93 | 20 MINUTES |
| | ☐ 30% | 310260110283512 | GSM | PROCEDURAL | 614 / 43 | -90 | 12 MINUTES |
| | ☐ 30% | 310260110283936 | GSM | PROCEDURAL | 685 / 52 | -85 | 12 MINUTES |
| | ☐ 65% | 310410389951341 | UMTS | PROCEDURAL | 637 / 455 | -103 | 18 MINUTES |
| | ☐ 65% | 310410389951341 | UMTS | PROCEDURAL | 637 / 224 | -100 | 12 MINUTES |
| | ☐ 65% | 310410389951341 | UMTS | PROCEDURAL | 4384 / 448 | -83 | 12 MINUTES |
| | ☐ 65% | 310410389951341 | UMTS | PROCEDURAL | 637 / 448 | -89 | 12 MINUTES |
| | ☐ 65% | 310260110843936 | UMTS | PROCEDURAL | 2087 / 49 | -86 | 12 MINUTES |
| | ☐ 65% | 310260110843936 | UMTS | PROCEDURAL | 2087 / 322 | -90 | 12 MINUTES |
| | ☐ 40% | 310260224201 | LTE | PROCEDURAL, STATISTICAL | 875 / 414 | -60 | 12 MINUTES |
| | ☐ 40% | 310260224202 | LTE | PROCEDURAL, STATISTICAL | 2001 / 268 | -48 | 12 MINUTES |
| | ☐ 65% | 310410389951319 | UMTS | PROCEDURAL | 637 / 270 | -105 | AN HOUR |
| | ☐ 65% | 310410389951319 | UMTS | PROCEDURAL | 637 / 299 | -104 | 2 HOURS |
| | ☐ 100% | 310260413353963 | GSM | PROCEDURAL | 684 / 63 | -50 | AN HOUR |
| | ☐ 65% | 310410389951341 | UMTS | PROCEDURAL | 4384 / 224 | -89 | 12 MINUTES |
| | ☐ 30% | 310260110283692 | GSM | PROCEDURAL | 612 / 30 | -97 | 13 MINUTES |
| | ☐ 65% | 310260110843512 | UMTS | PROCEDURAL | 2087 / 339 | -101 | AN HOUR |
| | ☐ 100% | 310260110282016 | GSM | PROCEDURAL, STATISTICAL | 683 / 48 | -99 | 31 MINUTES |

*FIG. 5*

| CONFIDENCE | GCI | RAT | TRIGGERS | CHANNEL/CODE | BITS ID | LAST SEEN | FIRST SEEN |
|---|---|---|---|---|---|---|---|
| 100% | 0010213666 | LTE | MASTER, PROCEDURAL | 650 / 14 | 001 | MON AUG 28 2017 13:27:... | THU AUG 24 2017 16:06:4 |
| 100% | 3102605666 | GSM | PROCEDURAL, STATISTICAL | 128 / 0 | 001 | FRI AUG 25 2017 16:51:45... | FRI AUG 25 2017 13:56:35 |
| 100% | 0010510010 | GSM | MASTER, PROCEDURAL | 9 / 2 | 001 | MON AUG 28 2017 15:38:... | FRI AUG 25 2017 14:00:23 |
| 100% | 001022000016969 | GSM | MASTER, PROCEDURAL | 987 / 39 | 001 | FRI AUG 25 2017 16:51:45... | FRI AUG 25 2017 14:11:13 |
| 85% | 3102601102820161 | GSM | PROCEDURAL, STATISTICAL, RXL | 683 / 48 | 001 | TUE OCT 10 2017 09:09:4... | TUE AUG 29 2017 11:55:5 |
| 100% | 310260130 | GSM | PROCEDURAL, STATISTICAL | 512 / 0 | 001 | THU SEP 14 2017 16:58:3... | THU SEP 14 2017 16:34:4 |

*FIG. 6*

| CELL INFORMATION | |
|---|---|
| RAT | UMTS |
| BAND | BAND 2 – 1900 – PCS A-F |
| NETWORK | AT&T; WIRELESS INC. (UNITED STATES) |
| PLMN | 310410 |
| LAC | 38996 |
| CELL ID | 13487 |
| CGI | 3104103899613487 |
| UARFCN | 412 |
| PSC | 508 |
| EC/NO | -17 |
| RSCP | -108 |
| FREQ. MHz | 1932.50 |
| FULL DECODE | YES |
| NEIGHBORS COMPLETE | YES |

BA-LIST (0)

INTRA FREQUENCY CELLS (1)

INTER RAT CELLS (0)

SIBs (7)
EXPAND ALL    COLLAPSE ALL

| | |
|---|---|
| SIB 1 | NAS INFORMATION |
| SIB 2 | AVAILABLE URAs |
| SIB 3 | CELL SELECTION/RESELECTION PARAMETERS USED BY UE IN IDLE MODE |
| SIB 5 | COMMON PHYSICAL CHANNELS INFORMATION FOR UE IN IDLE MODE |
| SIB 7 | FAST CHANGING CELL PARAMETER INFORMATION |
| SIB 11 | MEASUREMENT CONTROL INFORMATION UE IN IDLE MODE |
| MIB | MASTER INFORMATION BLOCK |

*FIG. 8*

ROGUE BASE STATION ROUTER DETECTION WITH STATISTICAL ALGORITHMS

CROSS-REFERENCE TO RELATED APPLICATIONS

This application claims the benefit of priority of U.S. Provisional Application No. 62/578,010 filed Oct. 21, 2017, entitled "Rogue Base Station Router Detection and Identification with Machine Learning Algorithms," U.S. Provisional Application No. 62/578,016 filed Oct. 27, 2017, entitled "Rogue Base Station Router Detection and Identification with Statistical Algorithms," and U.S. Provisional Application No. 62/578,021 filed Oct. 27, 2017, entitled "Rogue Base Station Router Detection and Identification with Procedural Algorithms," the contents of which are incorporated by reference in their entirety herein.

FIELD

This application is generally related to methods and architectures for detecting and identifying a cellular rogue base station router (RBSR) via statistical algorithms.

BACKGROUND

By 2020, tens of billions of connected Internet of Things (IoT) devices with wireless interfaces will be in the marketplace and connect the modern world. Almost half of those IoT devices will have cellular radios. As a result, the likelihood of experiencing a cyber-attack by an RBSR continues to increase. Generally, RBSRs are classified as cellular routers that transmit outside the authority of the governing regulatory agency.

At a rudimentary level, low-cost commercial hardware and open source software can be employed by third parties to inflict significant attacks on enterprise Wi-Fi and cellular networks. Indeed, with a low-cost commercial off-the-shelf (COTS) software-defined radio (SDR) kit and open-source cellular base station software, a malicious actor can deny cellular service to smart devices and machine-to-machine (M2M) networks. Further, a malicious actor can remotely track persons via their phones, snoop on communications, and inject malicious software into devices. The consequences can range fern unfavorable user experiences and social disturbances to more significant concerns including financial loss and negative media exposure.

There is a need in the art for techniques and architectures for detecting an RBSR, such as an illegal/rogue commercial cellular tower in a network, over multiple cellular protocols.

There is a need in the art for techniques and architectures for identifying the technologies in use (e.g., Open BTS, OpenAirInterfaceLTE, etc.) by a detected RBSR.

There is also a need in the art for techniques and architectures for detecting a precursor event to cellular attacks over multiple cellular protocols.

There is yet further a need in the art for techniques and architectures for testing a base station router (BSR) in a cellular network.

SUMMARY

The foregoing needs are met, to a great extent, by the application, which describes systems and techniques for detecting and identifying RBSRs across-multiple cellular protocols. The foregoing needs are also met, to a great extent, by the application, which further describes systems and techniques for identifying the technologies in use by RBSRs across multiple cellular protocols.

One aspect of the patent application is directed to a method for detecting an RBSR in a network, including the step of providing an algorithm that includes predetermined criteria, which is to be executed by a processor, for identifying an RBSR. The method also includes a step of performing a repeated cellular scan across the network. The method also includes a step of receiving, from the cellular scan, survey data including information of plural devices associated with the predetermined criteria. The method farther includes a step of displaying, via a graphical user interface (GUI), distribution curves and the associated calculated means and standard deviations based on the survey data for the predetermined criteria. The method also includes a step of comparing the information of one of the plural devices with the distribution curve. The method further includes a step of determining if the compared information of the one device exceeds a predetermined threshold of standard deviations from the calculated mean for a given parameter and calculating a confidence percentage that the device is potentially an RBSR.

Another aspect of the application is directed to a system for testing a cellular network including a non-transitory computer-readable media storing instructions for determining if a cellular attack on a communication system is active. The instructions are executed by a processor to perform, for example, identification of an RBSR in the communication system via a cellular scan. The processor also performs aspects of determining if a BSR in the communication system is an RBSR based upon a statistical algorithm that processes survey data associated with every public land mobile network (PLMN) in each radio access technology (RAT) of interest. The processor also executes the instructions of determining if an event directed to cellular connectivity is present in the communication system. The processor also executes the instructions of computing a confidence level that potential RBSRs are in fact rogue BSRs and a confidence that an active cellular attack is underway, based on reviewed cellular broadcast information and determination of the nature of the event.

Yet another aspect of the application is directed to a system including a non-transitory computer-readable media storing instructions for detecting and identifying RBSRs. A processor executes the instructions including, for example, configuring an algorithm that includes a statistically derived algorithm for detecting RBSRs in the cellular network. The processor also executes the instructions for calculating distribution curves including calculated means and standard deviations for predetermined criteria of decoded cellular survey data. The processor also executes the instructions of determining information associated with the predetermined criteria for a BSR that exceeds a predetermined threshold of standard deviations from the calculated mean of the calculated distribution curve. The processor also executes the instructions for determining that the BSR exhibits characteristics of an RBSR.

There has thus been outlined, rather broadly, certain embodiments of the application in order that the detailed description thereof may be better understood, and in order that the present contribution to the art may be better appreciated. There are, of course, additional embodiments of the application that will be described below and that will form the subject matter of the claims appended hereto.

BRIEF DESCRIPTION OF THE DRAWINGS

In order to facilitate a fuller understanding of the application, reference is made to the accompanying drawings, in which like elements are referenced with like numerals. These drawings should not be construed to limit the application and are intended only for illustrative purposes.

FIG. 5 illustrates a GUI on a display and showing detected RBSRs in a network according to an aspect of the application.

FIG. 6 illustrates a GUI on a display and showing detected RBSRs in a network according to an aspect of the application.

FIG. 8 illustrates a GUI on a display and showing decoded cellular broadcast information for a cell according to an aspect of the application.

DETAILED DESCRIPTION

Figure 1A:
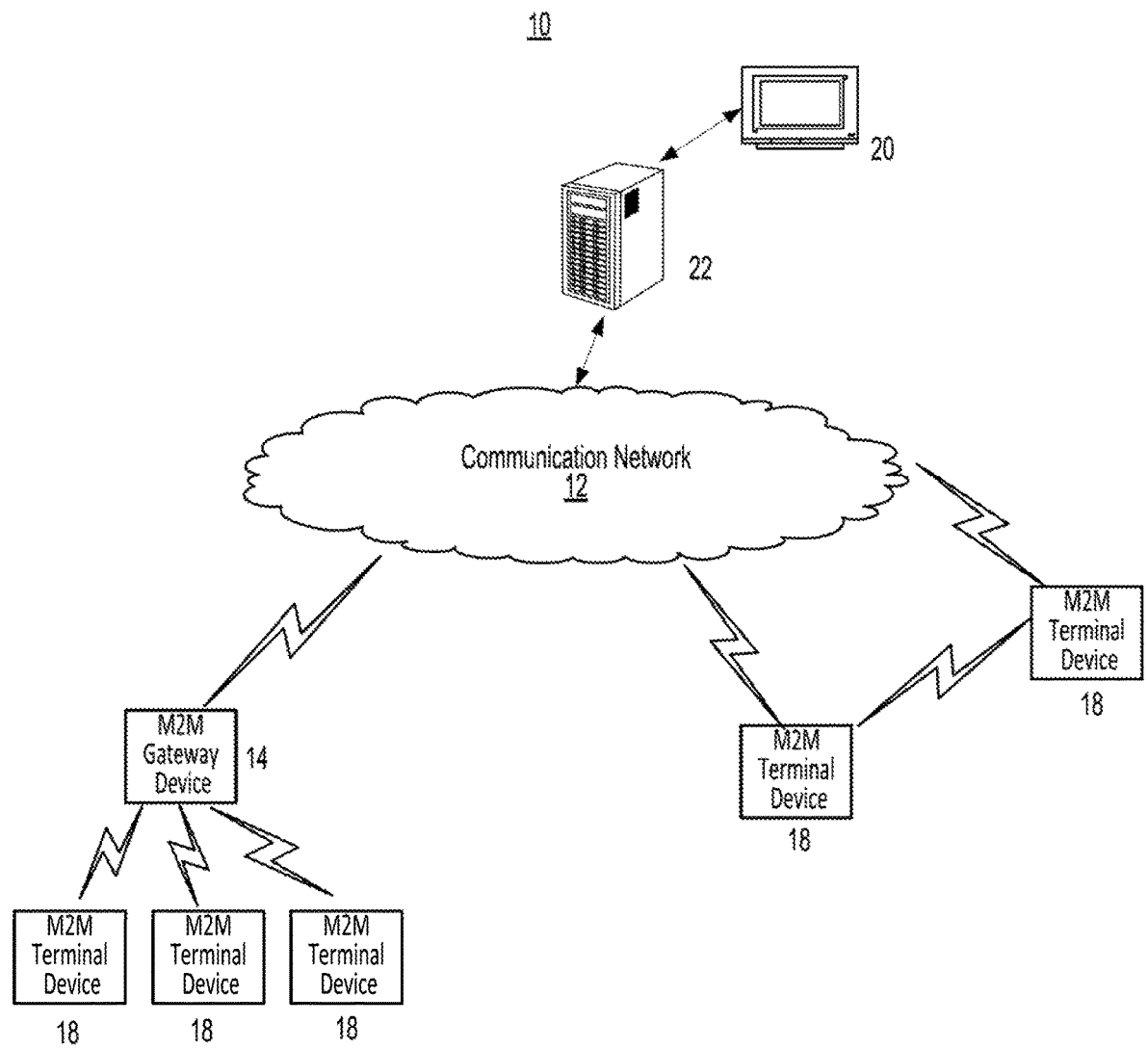
FIG. 1A illustrates a system diagram of an exemplary M2M IoT, or Web of Things (WoT) communication system in which one or more disclosed embodiments may be implemented.

The application is not limited in its application to the details of construction and to the arrangements of the components set forth in the following description or illustrated in the drawings. The application is capable of embodiments in addition to those described and of being practiced and carried out in various ways. Also, the phraseology and terminology employed herein, as well as in the Abstract, are for the purpose of description and should not be regarded as limiting.

For purposes of this patent application, an RBSR can be interchangeably referred to as a rogue cellular tower. Likewise, a BSR can be interchangeably referred to as a cellular tower.

In a first aspect of the patent application, an architecture is provided including a non-transitory computer-readable media, such as a software application, storing instructions that, when executed by a processor, perform steps to detect RBSRs in a network. The instructions and progress of the steps can be viewed and manipulated via a GUI appearing on a display operably coupled to the processor. In one embodiment, the executed instructions detect malicious or outlier cellular base stations based on decoded system information wirelessly broadcast therefrom.

In one embodiment of this aspect, the executed instructions include the steps of running a cellular scan across a region or network. The cellular scan uncovers various survey data for devices in the network, including system information blocks (SIBs). The processor executing the instructions decodes the uncovered SIBs for various devices.

In an exemplary embodiment, a software algorithm with configurable, statistically derived, parameterized thresholds can analyze a set of collected broadcast parameters and trigger alerts or other actions when one or more thresholds is out of specified bounds relative to like-carrier peers. Thresholds are calculated by the algorithm based upon the specified number of standard deviations, above and/or below, from the calculated mean for a given parameter at which rogue activity is expected to occur. The knowledge of how many standard deviations from the calculated mean is expected for each parameter can be the result of a priori knowledge, statistical analysis, or other algorithms.

While an impersonating RBSR may be able to mimic select broadcast parameters, it often cannot mimic others as precisely. When one or more out-of-bounds parameters occur within a complete collection of a given tower's broadcast information, even if other parameters associated with the given tower are within the statistically derived thresholds, it can be reasonably determined that the given tower is potentially electronically impersonating a commercial carrier's tower on the commercial carrier's cellular network and is therefore rogue.

The threshold settings can be manually configured by an advanced user. Alternatively, the threshold settings can be automatically configured by other algorithms that analyze the average settings for a given cellular network. In another alternative, they can be configured a priori.

In a second aspect of the patent application, an architecture is described including a non-transitory computer-readable media storing instructions that, when executed by a processor, perform the steps of detecting that a cellular attack is imminent or presently occurring. The instructions and progress of the detection steps can be viewed and manipulated via a GUI appearing on a display operably coupled to the processor.

In a third aspect of the patent application, an architecture is described including a non-transitory computer-readable media storing instructions that, when executed by a processor, performs the steps of testing and determining that a BSR is operating within predetermined ranges in a cellular communication system (e.g., not as an RBSR). The software instructions and progress of the detection steps can be viewed and manipulated via a GUI appearing on a display operably coupled to the processor.

The inventive concepts of this application, at least those directed to detecting and identifying RBSRs as well as those directed to preventing or minimizing exposure to cyber-attacks within a cellular network, are not considered routine, conventional, or well-understood in the field. Namely, the skilled person would readily consider the invention, and the accompanying claims, to be directed to patent eligible subject matter under the Alice two-step framework. Namely, the inventive concepts are not abstract since they improve the technical field of cyber security by efficiently determining what, if any, devices are RBSRs, and generating a warning if signs of a cellular attack are present. The executed instructions provide a certain degree of confidence upon analyzing hundreds, perhaps thousands, of devices in a network in a short time period. Moreover, the detection occurs in real-time and may be performed in continuous/ repeated mode. In the field of cyber security, every minute of a suspected or current cellular attack is critical. Therefore, notifications are rapidly sent to users in the network once a BSR exceeds a predetermined confidence level and is designated as an RBSR. The accuracy and speed at which the analysis and further notification to users are performed in the network simply could not have been done by a human or by conventional software.

System Information

Cellular BSRs broadcast information over wireless media to enable user equipment (UE) to communicate with and connect to the BSR. As an example, broadcast information transmitted by LTE cellular BSRs is herein described, although the same or similar information or types of information may be applicable with respect to other wireless mediums or protocols. The SI of LTE cellular BSRs is transmitted over the BCH. UE devices receive BCH signaling information on the downlink channel. The three types of BCHs include the broadcast control channel (BCCH), synchronization channel (SCH), and the frequency correction channel (FCCH).

The SI includes a static part and a dynamic part. The static part, referred to as the master information block (MIB), is transmitted using the BCH, and is carried by a physical broadcast channel (PBCH) every 40 ms. The MIB contains information such as channel bandwidth, physical channel hybrid-ARQ indicator channel (PHICH) configuration information, transmit power, number of antennas, and SIB scheduling information transmitted along with other information on the downlink-scheduled channel (DL-SCH).

The dynamic part of SI includes the SIB. The SIB is mapped to radio resource control (RRC) messages (SI-1,2, 3,4,5,6,7,8,9,10,11) over the DL-SCH and is transmitted using the physical downlink shared channel (PDSCH) at periodic intervals. For example, SI-1 is transmitted every 80 ms, SI-2 is transmitted every 160 ms, and SI-3 is transmitted every 320 ms.

SIBs are grouped in SI containers. Each SI is composed of multiple SIBs. Each SI will usually have a different transmission frequency and will be sent in a single subframe. SIBs are transmitted using BCCH mapped on DL-SCH, which is in turn mapped on PDSCH. Table 1 below describes the MIB and SIBs in LTE.

TABLE 1

| LTE MIB and SIBs | Description |
| --- | --- |
| MIB | Carries physical layer information of LTE cell, which in turn help receive further SIs, i.e., system bandwidth. |
| SIB1 | Contains information regarding whether of not UE is allowed to access the LTE cell. SIB1 also defines the scheduling of the other SIBs. SIB1 carries a cell ID, mobile country code (MCC), mobile network code (MNC), tracking area code (TAC), and SIB mapping. |
| SIB2 | Carries common channel as well as shared channel information. SIB2 also carries radio resource control (RRC), uplink power control, preamble power ramping, uplink Cyclic Prefix Length, sub-frame hopping, and uplink E-UTRA absolute radio frequency channel number (EARFCN). |

TABLE 1-continued

| LTE MIB and SIBs | Description |
| --- | --- |
| SIB3 | Carries cell re-selection information as well as Intra frequency cell re-selection information. |
| SIB4 | Carries Infra Frequency Neighbors (on same frequency). Carries serving cell and neighbor cell frequencies required for cell reselection as well as handover between same RAT base stations and different RAT base stations. |
| SIB5 | Carries Inter Frequency Neighbors (on different frequency). Carries E-UTRA LTE frequencies and other neighbor cell frequencies from other RATs. The purpose is cell reselection and handover. |
| SIB6 | Carries wideband code division multiple access (WCDMA) neighbors information, i.e., serving universal terrestrial radio access (UTRA) and neighbor cell frequencies useful for cell re-selection |
| SIB7 | Carries neighbors' information. Used for cell re-selection as well as for handover purposes. |
| SIB8 | Carries code-division multiple access (CDMA)-2000 EVDO frequencies and CDMA-2000 neighbor cell frequencies. |
| SIB9 | Carries Home eNodeB Identifier (HNBID) |
| SIB10 | Carries east west technical services (ETWS) primary notification |
| SIB11 | Carries ETWS secondary notification |

General Architecture

FIG. 1A is a diagram of an example M2M IoT, or WoT communication system 10 in which one or more disclosed embodiments may be implemented. Generally, M2M technologies provide building blocks for IoT or WoT systems, and any M2M device, M2M gateway, M2M server, or M2M service platform may be a component or node of an IoT or WoT system as well as an IoT or WoT Service Layer, etc.

As shown in FIG. 1A, the M2M, IoT or WoT communication system 10 includes a communication network 12. The communication network 12 may be a fixed network (e.g., Ethernet, Fiber, Integrated Services Digital Network (ISDN), Power Line Communication (PLC), or the like) a wireless network (e.g., Wireless Local Area Network (WLAN), cellular, or the like), or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as CDMA, time division multiple access (TDMA), frequency division multiple access (FDMA), orthogonal FDMA (OFDMA), single-carrier FDMA (SC-FDMA), and the like. Further, the communication network 12 may comprise other networks, such as a core network, die Internet, a sensor network, an industrial control network, a personal area network, a fused personal network, a satellite network, a home network, or an enterprise network.

As shown in FIG. 1A, the M2M, IoT, or WoT communication system 10 may include M2M gateway devices 14 and M2M terminal devices 18. It will be appreciated that any number of M2M Gateway Devices 14 and M2M terminal devices 18 may be included in the M2M, IoT, WoT communication system 10 as desired. Each of the M2M gateway devices 14 and M2M Terminal devices 18 are configured to transmit and receive signals, such as via communications circuitry, the communication network 12, or direct radio link. An M2M gateway device 14 allows wireless M2M devices (e.g., cellular and non-cellular) as well as fixed network M2M devices (e.g., PLC) to communicate either through operator networks, such as the communication network 12, or the direct radio link. For example, the M2M terminal devices 18 may collect data and send the data, via the communication network 12 or direct radio link, to an M2M application 20 or other M2M terminal device 18. The M2M terminal devices 18 may also receive data from the M2M application 20 or another M2M terminal device 18. Further, data and signals may be sent to and received from the M2M application 20 via an M2M Service Layer 22, as described below. M2M terminal devices 18 and M2M gateway devices 14 may communicate via various networks including, for example, cellular, WLAN, Wireless Personal Area Network (WPAN) (e.g., Zigbee, 6LoWPAN, Bluetooth), direct radio link, and wireline. Exemplary M2M terminal devices 18 that could be impacted by the presence of an RBSR include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 1B:
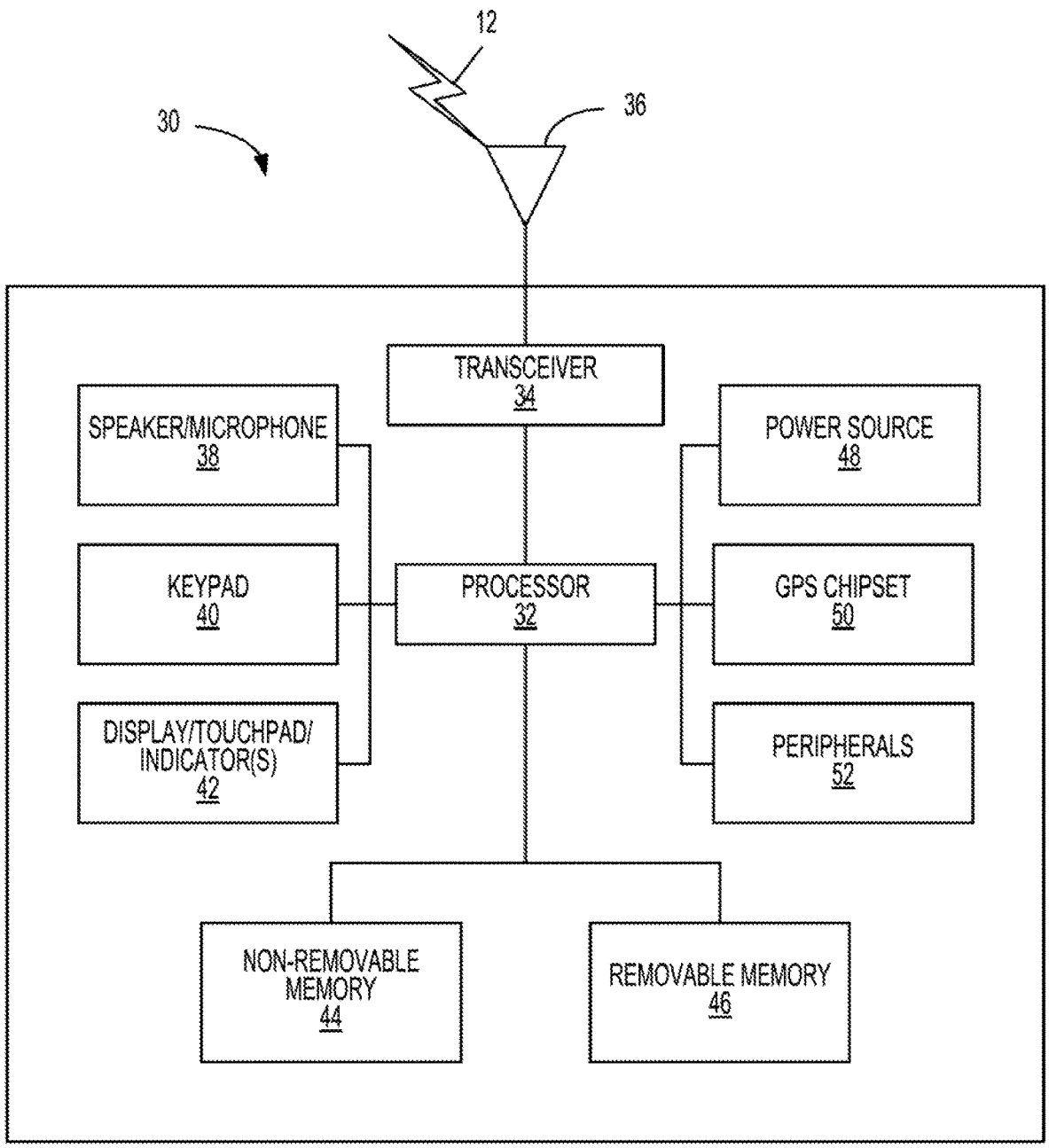
FIG. 1B illustrates a system diagram of an exemplary communication network node.

FIG. 1B is a block diagram of an exemplary hardware/software architecture of a node 30 of a network, such as clients, servers, or proxies, which may operate as an M2M server, gateway, device, or other node in an M2M network. The node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node 30. For example, the processor 32 may perform signal coding, data processing, power control, input/output processing, and/or any other functionality that enables the node 30 to operate in a wireless or wired environment. The processor 32 may run application-layer programs (e.g., browsers) and/or radio-access-layer (RAN) programs and/or other communications programs. The processor 32 may also perform security operations such as authentication, security key agreement, and/or cryptographic operations. The security operations may be performed, for example, at the access layer and/or application layer.

As shown in FIG. 1B, the processor 32 is coupled to its communication circuitry (e.g., transceiver 34 and transmit/receive element 36). The processor 32, through the execution of computer-executable instructions, may control the communication circuitry to cause the node 30 to communicate with other nodes via the network to which it is connected. While FIG. 1B depicts the processor 32 and the transceiver 34 as separate components, the processor 32 and the transceiver 34 may be integrated together in an electronic package or chip.

The transmit/receive element 36 may be configured to transmit signals to, or receive signals from, other nodes, including M2M servers, gateways, wireless devices, and the like. For example, in an embodiment, the transmit/receive element 36 may be an antenna configured to transmit and/or receive radio frequency (RF) signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless or wired signals.

In addition, although the transmit/receive element 36 is depicted in FIG. 1B as a single element, the node 30 may include any number of transmit/receive elements 36. More specifically, the node 30 may employ multiple-in and multiple-out (MIMO) technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, and a vehicle, such as a car, truck, train, or airplane. The node 30 may connect to other components, modules, or systems of such apparatuses or devices via one or more interconnect interfaces, such as an interconnect interface that may comprise one of the peripherals 52.

Figure 1C:
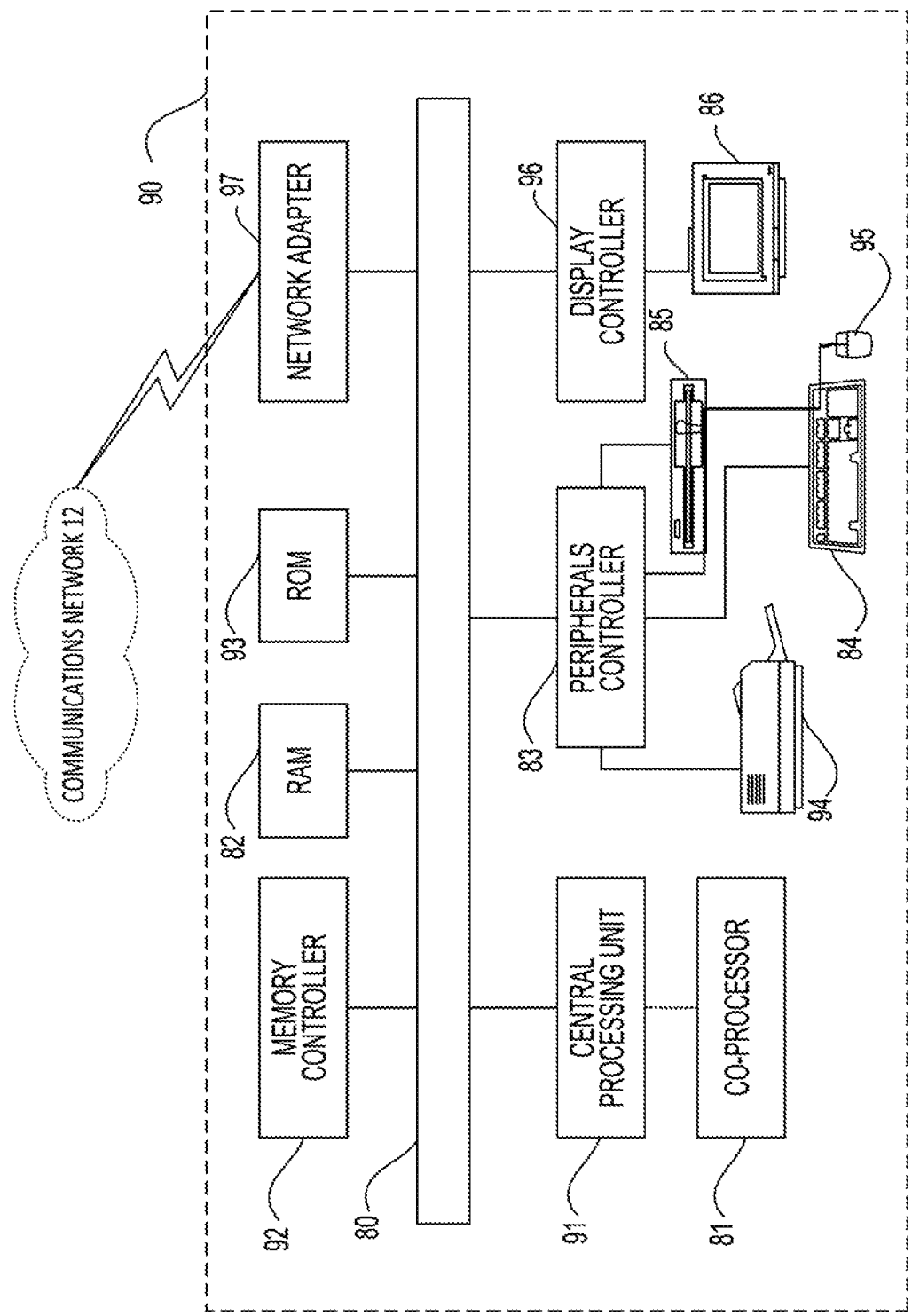
FIG. 1C illustrates a block diagram of an exemplary computing system.

FIG. 1C is a block diagram of an exemplary computing system 90 that may also be used to implement one or more nodes (e.g., clients, servers, or proxies) of a network, which may operate as an M2M server, gateway, device, or other node in an M2M network.

The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91. In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and (ROM 93. Such memories include circuitry that allows information to be stored and retrieved. The ROM 93 generally contains stored data that cannot easily be modified. Data stored in the RAM 82 may be read or changed by the CPU 91 or other hardware devices. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, the computing system 90 may contain a peripherals controller 83 responsible for communicating instructions from the CPU 91 to peripherals, such as a printer 94, a keyboard 84, a mouse 95, and a disk drive 85.

A display 86, which is controlled by a display controller 96, is used to display visual output generated fey the computing system 90. Such visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 90 may contain communication circuitry, such as a network adaptor 97, that may be used to connect the computing system 90 to an external communications network, such as the communication network 12 of FIG. 1A, to enable the computing system 90 to communicate with other nodes of the network.

RBSR Detection in a Cellular Network

Figure 2A:
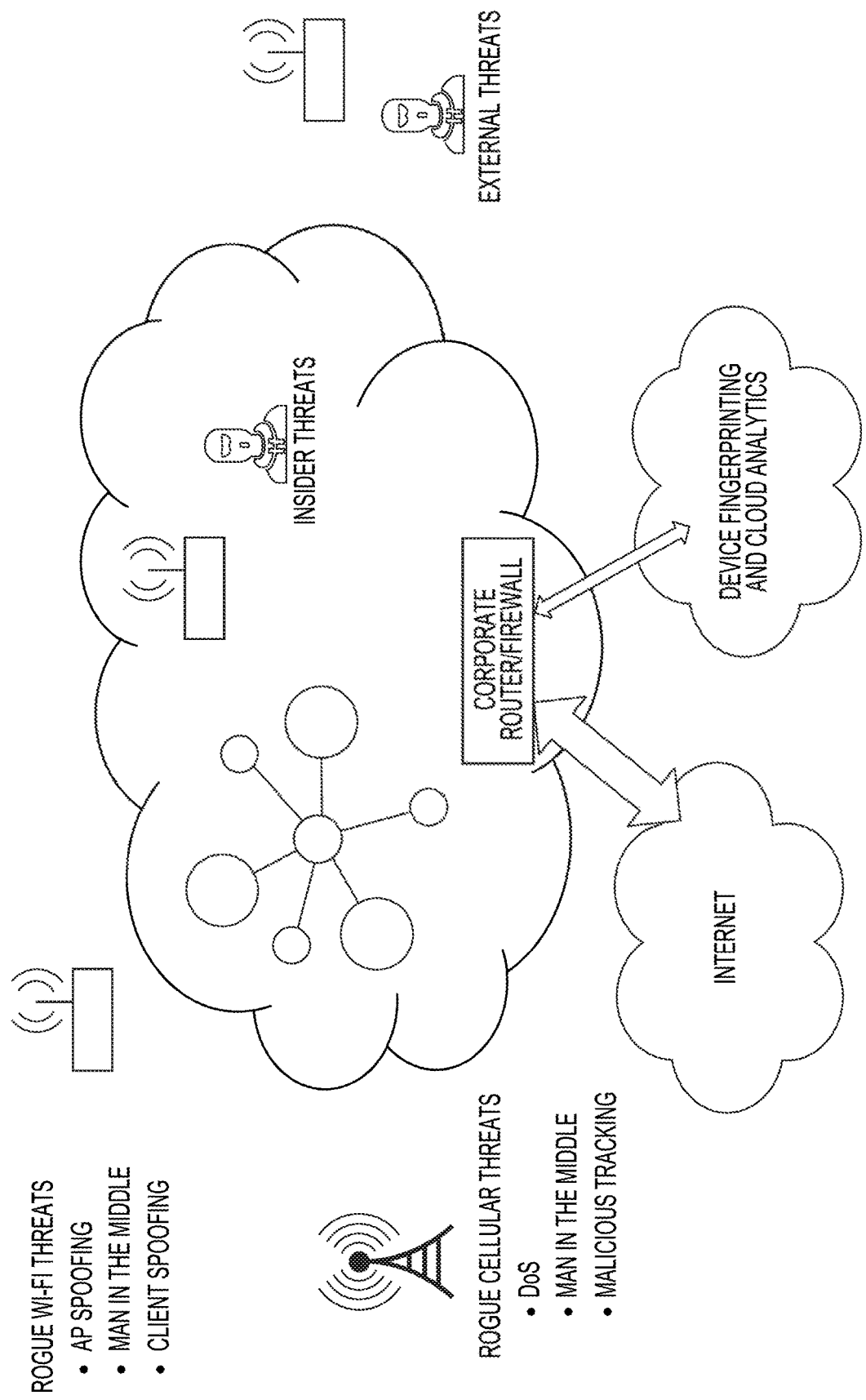
FIG. 2A illustrates a wireless threat landscape.

A wireless threat landscape is depicted in FIG. 2A. Specifically, the threats may come from either inside or outside of the network. Outside threats may include rogue Wi-Fi threats and rogue cellular threats.

The rogue cellular threats may occur via a man-in-the-middle (MITM) attack whereby the attacker secretly relays and possibly alters the communication between two parties who believe they are directly communicating with each other. One example is active eavesdropping, in which the attacker makes independent connections with the victims and relays messages between them to make them believe they are talking directly to each other over a private connection. Unfortunately, the conversation is controlled by the attacker. The attacker must be able to intercept all relevant messages passing between the two victims and inject new ones.

Rogue cellular threats may also include denial-of-service (DoS) wherein the perpetrator seeks to make a machine or network resource unavailable to its intended users by temporarily or indefinitely disrupting services of a host connected to the network. Denial of service is typically accomplished by flooding the targeted machine or resource with superfluous requests in an attempt to overload systems and prevent some or all legitimate requests from being fulfilled. In a distributed denial-of-service attack (DDoS attack), the incoming traffic flooding the victim originates from many different sources. This effectively makes it impossible to stop the attack simply by blocking a single source. A DoS or DDoS attack is analogous to a group of people crowding the entry door of a shop, making it hard for legitimate customers to enter, and thus disrupting trade.

Figure 2B:
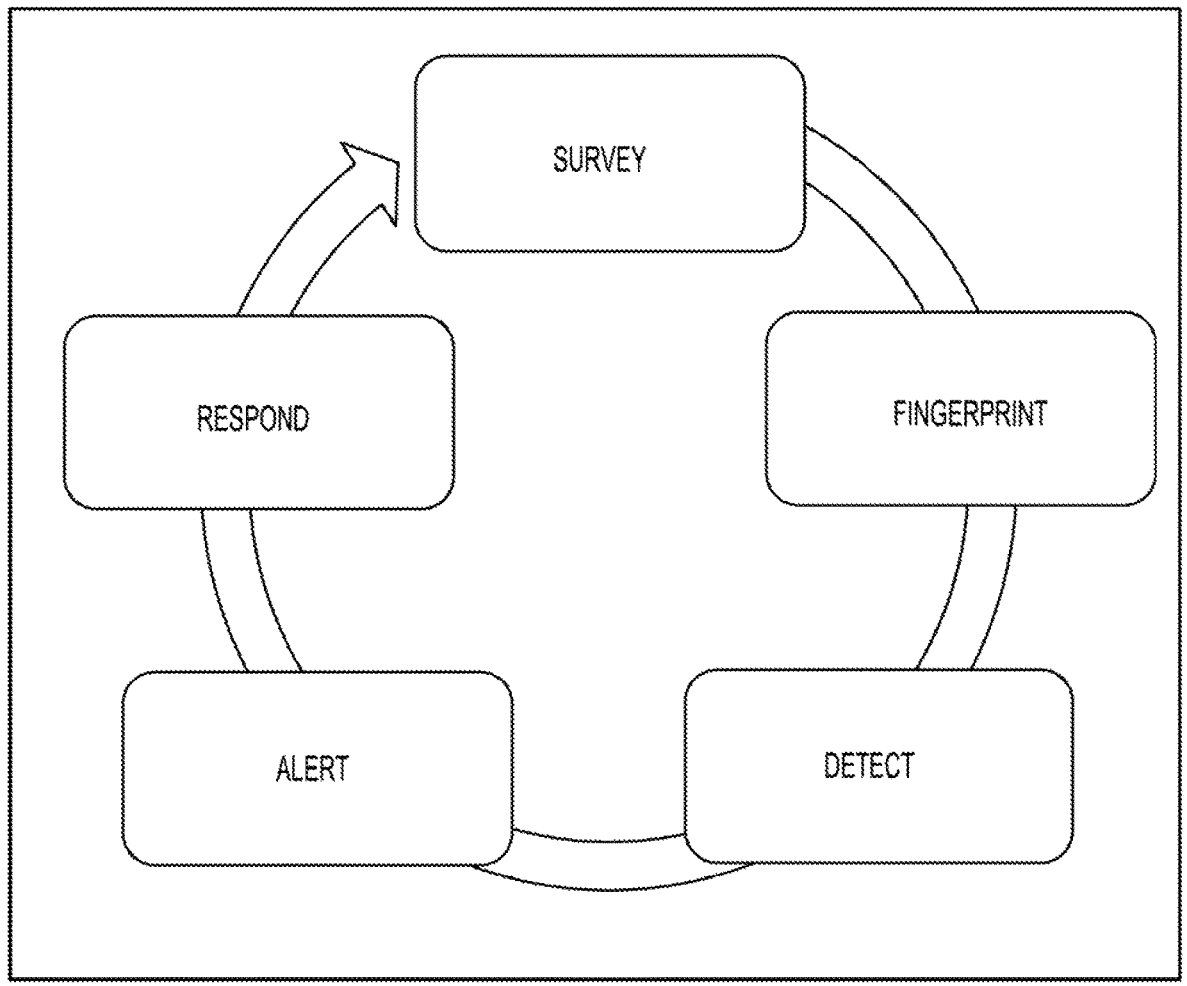
FIG. 2B illustrates a threat monitoring cycle for an RBSR detection and identification application.

According to one aspect of the patent application, FIG. 2B illustrates a general flow for an RBSR detection and identification software application. Moving clockwise beginning at noon in FIG. 2B, the software application persistently surveys, analyzes, and fingerprints survey data in the network. The RF data is decoded into BSR layer three broadcast messages. Example parameters indicated in layer three broadcast messages includes neighbor list contents and cell reselect offset (CRO). Select layer three broadcast message parameters are used by the procedural RBSR detection and identification algorithm to flag anomalous cells. The statistical RBSR detection algorithm separates the survey data based upon PLMN and RAT. The analysis of the survey data is then calculated for each PLMN in each RAT. Upon rogue detection, the application alerts users with a variety of configurable notification options, such as push alerts to a browser, texts, or emails. Such notifications may help users on the network become more vigilant with regard to future transmissions and receptions. Further, the software application can let an appropriate agency know of the RBSRs' illegal activities.

Figure 3:
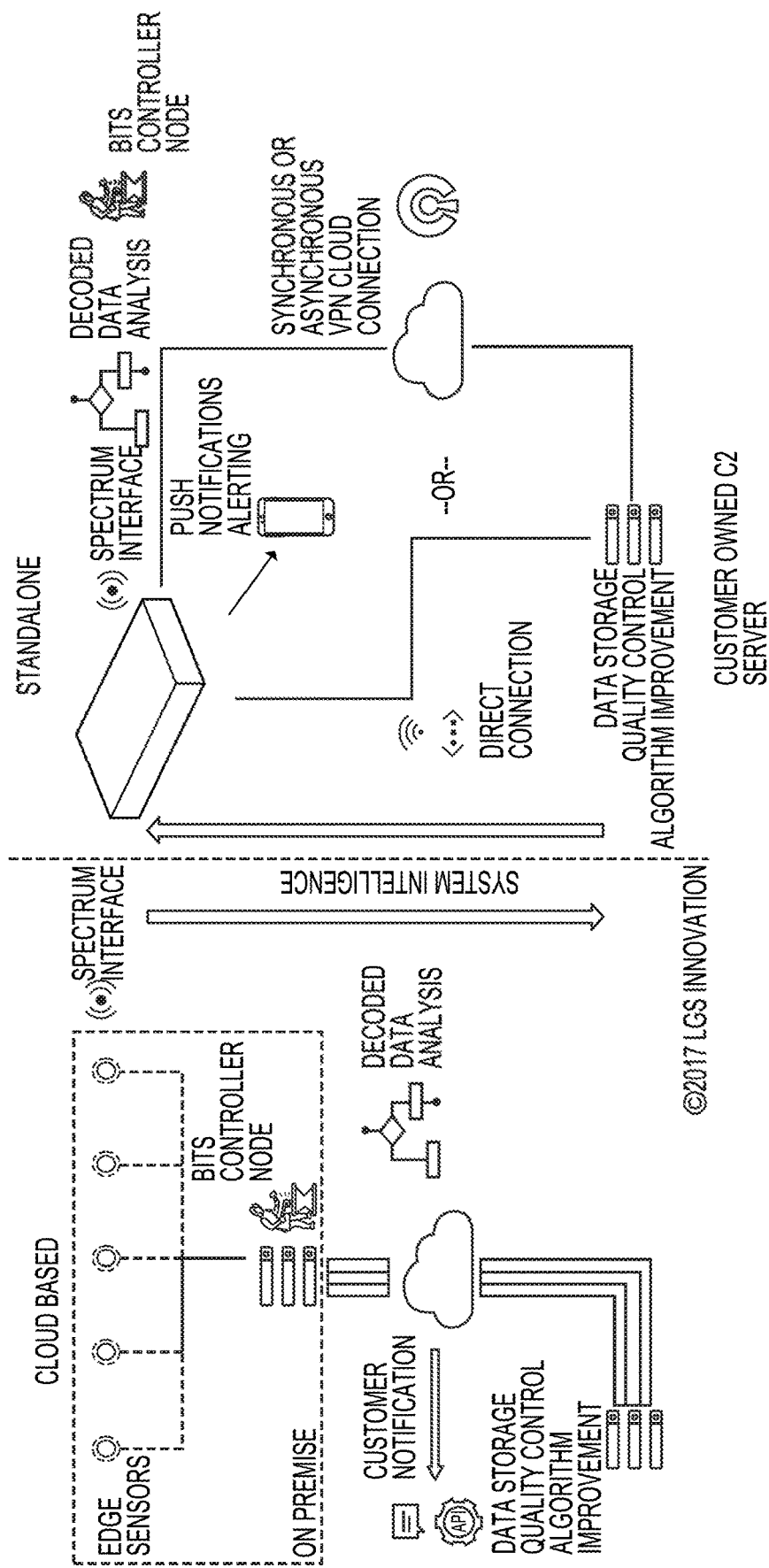
FIG. 3 illustrates cloud-based and standalone architectures for an RBSR detection and identification application according to an aspect of the application.

According to another aspect of the patent application, FIG. 3 illustrates an RBSR detection and identification system. As shown, the left side of FIG. 3 describes a cloud-based infrastructure, and the right side describes a standalone infrastructure. In the standalone architecture, the RBSR detection and identification system includes all the hardware and software required to run the full suite of detection algorithms locally. The standalone architecture is suitable for mobile operations and facilities that do not prefer cloud connections to their infrastructure. In such an implementation, each detector node must have all of the required hardware and software.

The cloud implementation is based on a local network of edge nodes that possess basic RF cellular survey capabilities and the ability to communicate to the Internet. Specifically, the cloud architecture includes lower-cost edge nodes that do not have the required hardware and software to make RBSR determinations in isolation. The cloud architecture can offload tasks performed at nodes in the standalone case (namely RF scan decode and RBSR detection and identification) to a central node. In the cloud architecture, RF survey data is passed from edge nodes to a local server that can perform filtering before forwarding the necessary data to a cloud instance where all RBSR detection and identification algorithms reside. In the cloud architecture, the statistical RBSR detection and identification algorithms can utilize data collected from geographically diverse locations to perform deeper analytics.

Figure 4:
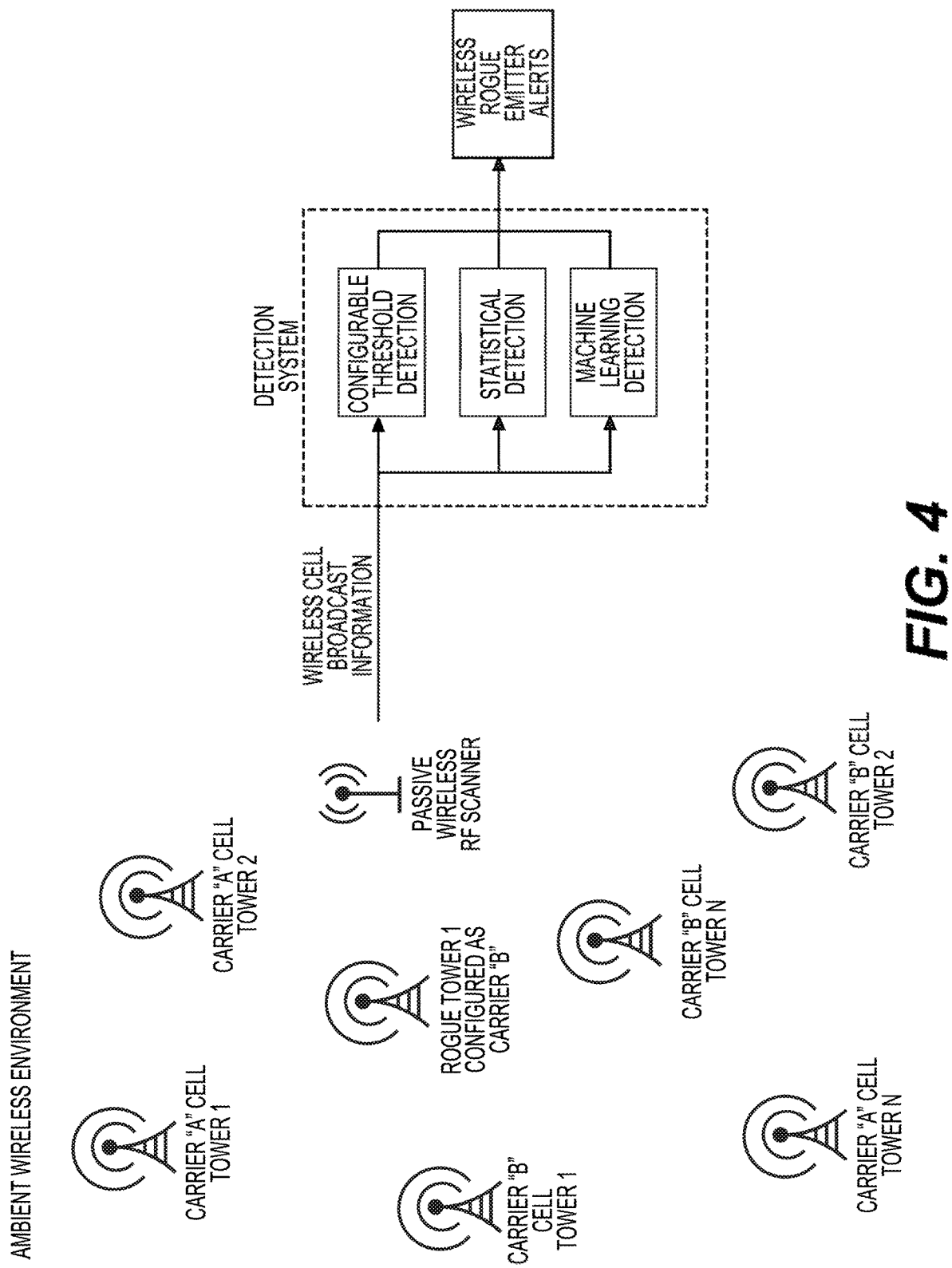
FIG. 4 illustrates a cellular environment with an RBSR present along with the detection and identification application ingesting cellular data from the cellular environment according to an aspect of the application.

FIG. 4 illustrates a use case embodiment for detecting an RBSR in an ambient wireless environment. In this exemplarily embodiment, a statistical detection algorithm is utilized by the processor of an apparatus to execute instructions. In another embodiment, the statistical detection algorithm may be used in conjunction with a configurable threshold detection algorithm, machine-learning algorithm, and other algorithms in determining a confidence level of a suspected base station/cellular tower being an RBSR.

As shown in FIG. 4, the detection system is a passive wireless RF scanner (i.e., transceiver) capable of detecting signals in the ambient wireless environment. In this embodiment, a rogue "Rogue Tower 1" has been intentionally introduced, for discussion purposes, into a commercial cellular broadcast environment and has been configured to electronically impersonate Carrier B's Cell Tower 1. This impersonation is observed by analyzing the information that Carrier B's Cell Tower 1 wirelessly broadcasts and comparing it with the information that the rogue cell tower (i.e., Rogue Tower 1) wirelessly broadcasts. Both may have similar information, such as a commercial carrier's unique PLMN code, which is used to distinguish carriers (e.g., AT&T from Verizon).

FIG. 5 illustrates a GUI on a display. The GUI presents a detection log of all detected cellular towers (i.e., BSRs) in an ambient environment. The detection log includes dropdowns for Anomalous Cells (which activates the GUI shown in FIG. 6), Settings, and Developer Settings. The columns of the detection log include a column indicating a confidence level that is based upon one or more predetermined criteria and one or more included algorithmic approaches. The detection log further includes columns indicating a cellular tower's Global Cell Identifier (GCI), RAT, associated triggers, channel/code, signal strength, and the last time the cellular tower was seen on the network. Specifically, the confidence level is a percentage ranging from 0-100%. For example, the cellular tower in the second row indicates a confidence level of 30% that this cellular tower may be an RBSR and is based upon the algorithm's findings. For this cellular tower, the RAT is Global System for Mobile communications (GSM), and it was last seen 12 minutes ago. Meanwhile, the cellular tower provided in the third row is operating in a GSM network with procedural and statistical triggers being employed. The third-row cellular tower's channel code is 616/62 and has a signal strength of −93 dBm. The third-row cellular tower was last seen 20 minutes ago. Based on the predetermined criteria employed in the procedural and statistical algorithms, the confidence level for determining that the third-row cellular tower is an RBSR is 100%. Meanwhile, the cellular tower in row 16 indicates a confidence level of 100% that this cellular tower is an RBSR. The sixteenth-row cellular tower is indicative of Rogue Cellular Tower 1 introduced into the system as shown in FIG. 4.

It is envisaged that the detection architecture continuously scans and runs updates in the ambient environment in real-time, which, in turn, allows the confidence level to be updated in real-time. By so doing, the system continuously checks for rogue devices to avoid false positives or negatives.

FIG. 5 also shows a notification in the GUI indicating that an RBSR is detected. The notification may be configured such that it appears at the first instance of a new RBSR exceeding a predetermined confidence level. Alternatively, the notification may appear periodically for every RBSR that continues to exceed a predetermined confidence level.

FIG. 6 illustrates a GUI of the detection system on a display. The GUI may be activated by selection of the Anomalous Cells dropdown item shown in FIG. 5 and presents a log generated by the RBSR detection and identification application. The log details which cellular towers (i.e., BSRs) were flagged as being potential RBSRs (i.e., anomalous BSRs). Notably, the generated log shows the level of confidence and the triggered algorithms, which indicate the degree to which the potential rogue is believed to be an RBSR. The GCI can be used to track the cell tower in a repeated iterative cellular survey to get more cell information as needed. The application also displays a recording of the time that the suspected rogue was initially and last seen. In so doing, events can be reconstructed over time, exported to other analysis tools, and archived.

Figure 7:
FIG. 7 illustrates a GUI on a display and showing a survey of towers in the network according to an aspect of the application.

FIG. 7 illustrates a GUI of the detection system on a display. The GUI presents a cellular survey of the cellular towers (i.e., BSRs) in the network. Here, the dashboard gives the date and time of the cellular survey. The GUI depicts a scan that is currently running. Specifically, the cellular survey has been running for 4 minutes and 11 seconds before a present time. The cellular survey began at 5:42:53 PM and the last measurement was several seconds prior to the present time. The last iteration time was 2 minutes, and 53 seconds prior to the present time. The iteration count is 1.

The GUI in FIG. 7 also depicts the progression of decoding the SIBs in the network. The task bar indicates that 68.98% of the decoding is complete. The GUI also provides a count of cell towers by RAT. For LTE, there are 8 cell towers and 29 measurements. For Universal Mobile Telecommunications System (UMTS), there are 6 cell towers and 16 measurements. For GSM, there are 5 cell towers and 13 measurements. In total, there are 19 cell towers and 58 measurements.

FIG. 8 illustrates a GUI of the detection system on a display. The GUI presents decoded cellular broadcast information for a cellular tower, such as for example, one of the cellular towers indicated in FIGS. 4-6. In this instance, the cell information indicates that the carrier is AT&T with a PLMN of 310410. The RAT is UMTS and the band is band 2-1900-PCS A-F. This broadcast information can be obtained, for example, with free software applications and low-cost hardware, public databases, and COTS or custom application-specific devices.

The GUI shown in FIG. 8 also indicates a BA-List, Intra-Frequency Cells, Inter Rat Cells, and SIBs. Under the dropdown for SIBs, SIBs 1, 2, 3, 5, 7, and 11 and the MIB are displayed. SIB 1 is for Non-Access Stratum (NAS) information; SIB 2 is for available Universal Terrestrial Radio Access Network (UTRAN) Registration Areas (URAs); SIB 3 is for cell selection/reselection parameters used by UE in idle mode; SIB 5 is for common physical channels information for UE in idle mode; SIB 7 is for fast changing cell parameter information; SIB 11 is for measurement control information for UE in idle mode; and MIB is for the master information block.

Figure 9:
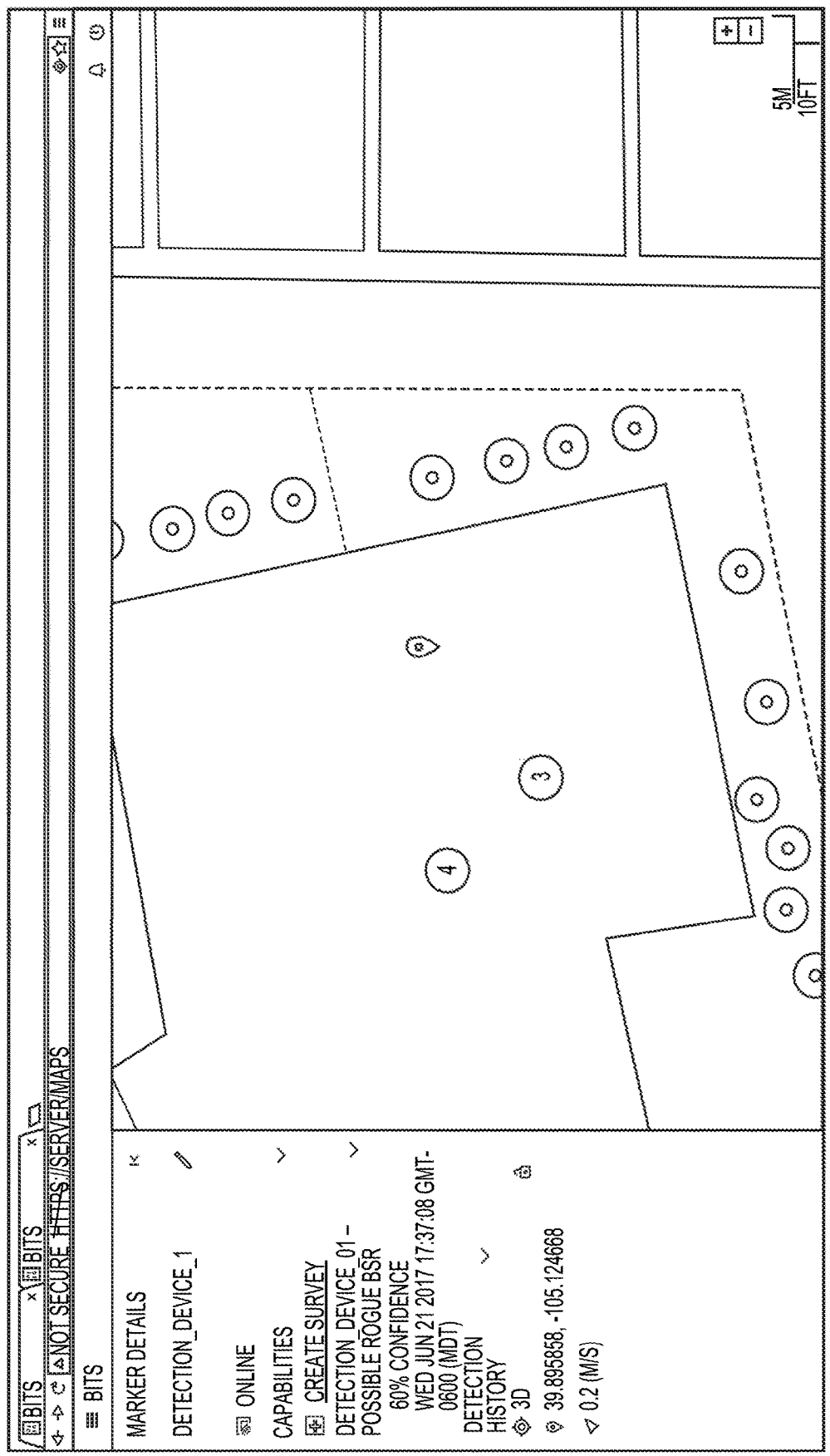
FIG. 9 illustrates a GUI on a display and showing a mapped, potential RBSR according to an aspect of the application.

If the detection system has GPS capability, location data can also be logged and mapped. FIG. 9 illustrates an exemplary embodiment where a GUI on a display illustrates an RBSR in an environment. The left side of the GUI provides capabilities including, but not limited to, creating a survey and viewing a potential RBSR with confidence levels. The left side of the GUI also provides detection history and accurate positioning of a potential RBSR.

Figure 10:
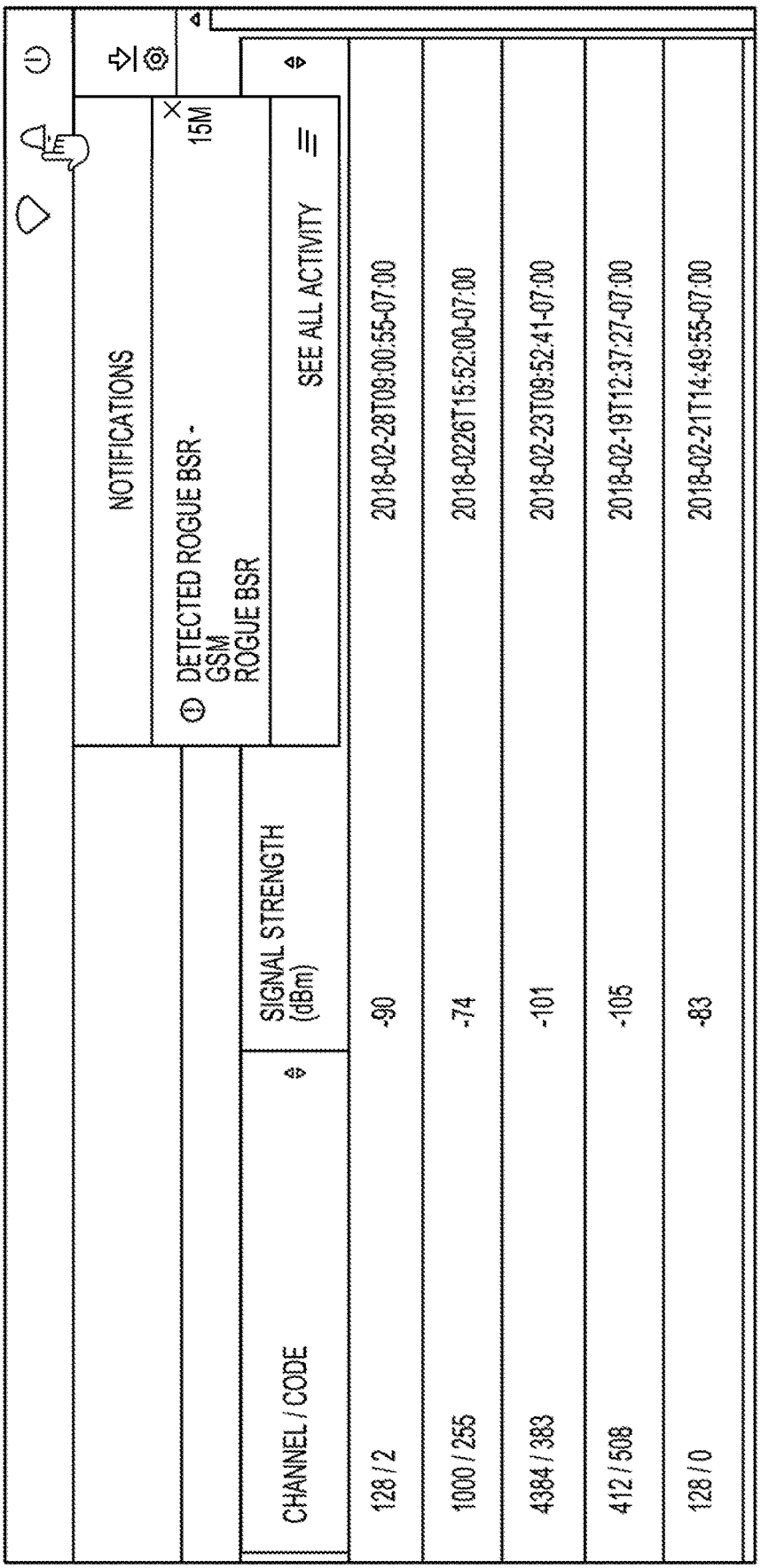
FIG. 10 illustrates a GUI on a display and showing a notification of an RBSR according to an aspect of the application.

According to another aspect of this patent application, FIG. 10 depicts a GUI on a display. The GUI indicates notifications to users that a particular device/BSR exhibits characteristics of an RBSR. A software algorithm with statistically configurable parameterized thresholds can analyze a set of collected broadcast parameters, trigger alerts, or indications of other actions when one or more configurable thresholds is outside commercial (e.g., predetermined) bounds, or when known commercial (e.g., predetermined) parameters are not present at all in the collection relative to like-carrier peers. The knowledge of which collected parameter values are out of bounds and how the thresholds should be configured can be the result of a priori knowledge, other algorithms, or statistical analysis. When one or more out-of-bounds or absent parameters occur within a complete collection of a given cellular tower's broadcast information and that broadcast information has some similar parameters to a commercial carrier, it can be reasonably determined that it is potentially electronically impersonating a commercial carrier's cellular tower on the cellular network.

Detecting a Precursor to a Cellular Network Attack

According to another aspect of the patent application, an attack on a cellular communication system is typically preceded by detecting one or more RBSRs in the system. As discussed above, the RBSRs can be configured with inexpensive hardware and open source software and can be configured to electronically impersonate authentic BSRs in the cellular network. The RBSRs also can be concealed, such as in a backpack with a battery, and introduced into a system. The methods for detecting an RBSR are described above in significant detail.

The target cellular systems can span a wide variety of device types such as personal and business handsets and M2M communication links, as illustrated in FIG. 1A. The types of cellular attack can range from a basic DoS to more advanced attacks such as MITM snooping and impersonating, unwarranted location tracking, and malware injection into connected clients. These attacks affect public safety, critical infrastructure stability, and revenue for businesses.

According to an embodiment, when an RBSR detection and identification system detects an electronically-impersonated commercial cellular tower, and the detection is correlated with external events (e.g., cellular handsets or systems that cannot get service), the detection system can run advanced analytics to evaluate whether a cellular attack is underway. The advanced analytics may be helpful in discerning true threats from network issues, such as a network operator experiencing technical difficulties. According to another embodiment, a large occurrence of unplanned software update requests to commercial cellular handsets can be indicative of cellular attack in the presence of a detected rogue tower or RBSR. When the detection system determines that the cellular attack is underway, appropriate alerts and notifications may be sent to users in the system in accordance with the measures discussed earlier.

In an exemplary embodiment, an architecture is described as including a non-transitory computer-readable media having instructions for determining if a cellular attack on a communication system is occurring or is imminent. The instructions can be executed by a processor to determine whether a router or cellular tower in the communication system is rogue. The determination of whether a router or cellular tower is rogue is based on the router or cellular tower (and associated attributes, parameters, measurements, etc.) being out of range of predetermined criteria and associated statistically-derived parameterized thresholds. Another executed instruction includes determining if an external event exhibiting a characteristic of a cellular attack is occurring in the communication system. Yet another executed instruction includes computing a confidence level of a cellular attack in view of the determined rogue router or cellular tower and the external event. Yet another executed instruction includes sending a notification to all subscribed users in the communication system that a cellular attack is currently taking place.

Cellular Network Testing

According to yet another aspect of the patent application, the detection system can be used to ensure a cellular BSR does not broadcast outside, either greater and/or less than, predetermined parameterized statistically-derived thresholds. This technique may be employed during development and testing of a new BSR system, when software loads are continuously iterated. The detection system serves as an automated notification platform that alerts developers when the BSR is broadcasting statistically anomalous broadcast information.

In one embodiment, an architecture is described that includes a non-transitory computer-readable media storing instructions that when executed by a processor perform aspects for determining whether a BSR is not operating in a cellular communication system as an RBSR (i.e., a BSR is broadcasting within an acceptable range). One of the executable instructions includes configuring predetermined criteria to evaluate if the BSR is operating within an acceptable range as specified by a series of statistically-derived, parameterized thresholds. Another executable instruction includes evaluating information of the BSR in view of the acceptable range. Another executable instruction includes determining if the BSR is operating out of range using an algorithm providing confidence weights for the predetermined criteria that may fall outside of the acceptable range. Yet another executable instruction includes notifying an administrator of the BSR operating of range. Yet a further executable instruction includes updating software of the BSR to fall within acceptable range of the predetermined criteria. The above-mentioned steps can be reiterated as necessary to ensure the BSR is acceptable for use in the communication system.

Augmenting Additional RBSR Algorithm Types

An RBSR system with configurable, statistically-derived, parameterized trigger thresholds can be used to augment other algorithms that have the same purpose, such as approaches having greater manual aspects, including the procedural approach and similarly automated machine learning approaches. A basic augmentation implementation would include a voting scheme such that the final confidence level corresponding to the algorithmic belief that a given BSR is rogue or not rogue is the weighted result of multiple algorithm confidences.

Detecting Illegal Cellular Broadcast Activity

According to yet a further aspect of the application, an outlier tower detected based on predetermined criteria may not always be a precursor of a cellular attack. That is, if the confidence level has been met, the BSR may be an inadvertent yet illegal configuration by a legitimate commercial carrier. Alternatively, the BSR or cellular tower could be the result of a researcher who accidentally configured a BSR to broadcast as a commercial carrier. Since the activity may violate certain laws and potentially disrupt public communication and safety, a notification may be sent to the appropriate authorities by the system. Such illegal cellular configuration or activity can be detected by surveying the cellular environment, statistically analyzing each of the surveyed cells against other similar surveyed cells, and determining outliers on a parameter-by-parameter basis. The determination of the outliers on a parameter-by-parameter basis may be based upon which cells are outside of the specified number of standard deviations from the calculated mean for a parameter.

Protection of Military Communication Systems

An RBSR detection and identification system with configurable, statistically-derived, parameterized trigger thresholds may find use in protecting a military field communication system configured to track and identify deployed forces (also referred to, in some cases, as a "blue force" tracking system) from wireless threats, such as the presence of one or more RBSRs. The RBSR detection and identification system can be applied to protect the field communication system during military operations, and can be used to minimize threats to components of the system (and associated friendly forces and personnel) from MITM attacks, tracking, malware injection, interruption in service, and the like (each of which could be critically detrimental to the success of an operation). In this scenario, when the statistically-derived thresholds are exceeded for one or more given parameters associated with a specific BSR, the statistical algorithm can report the potential RBSR to the system, which can calculate the final confidence that this specific BSR is a rogue, taking into account the output of other algorithms that may have been selected to run upon the same survey data.

If the final confidence exceeds a specific threshold, the system can flag a BSR as an RBSR, and alerts/actions can be set up to disable or alter the configuration of cellular radios on all or some wireless equipment associated with the force tracking and identification system until the RBSR has been neutralized. In this way, the system and associated forces and personnel are protected from MITM attacks, tracking, and malware injection. Technologies to move communication to an alternate protocol and/or a different cellular network may be tied into the system to ensure that communications of the force tracking and identification system are maintained and secure.

Rogue Detection and Identification with Statistical Algorithms

According to another aspect of the application, the statistical approach for detecting RBSRs involves fitting statistically derived distribution curves to decoded layer 3 broadcast data. The broadcast data provides specific values associated with each BSR within the scan area. The broadcast survey data is indexed by GCI, PLMN, and RAT.

Figure 11:
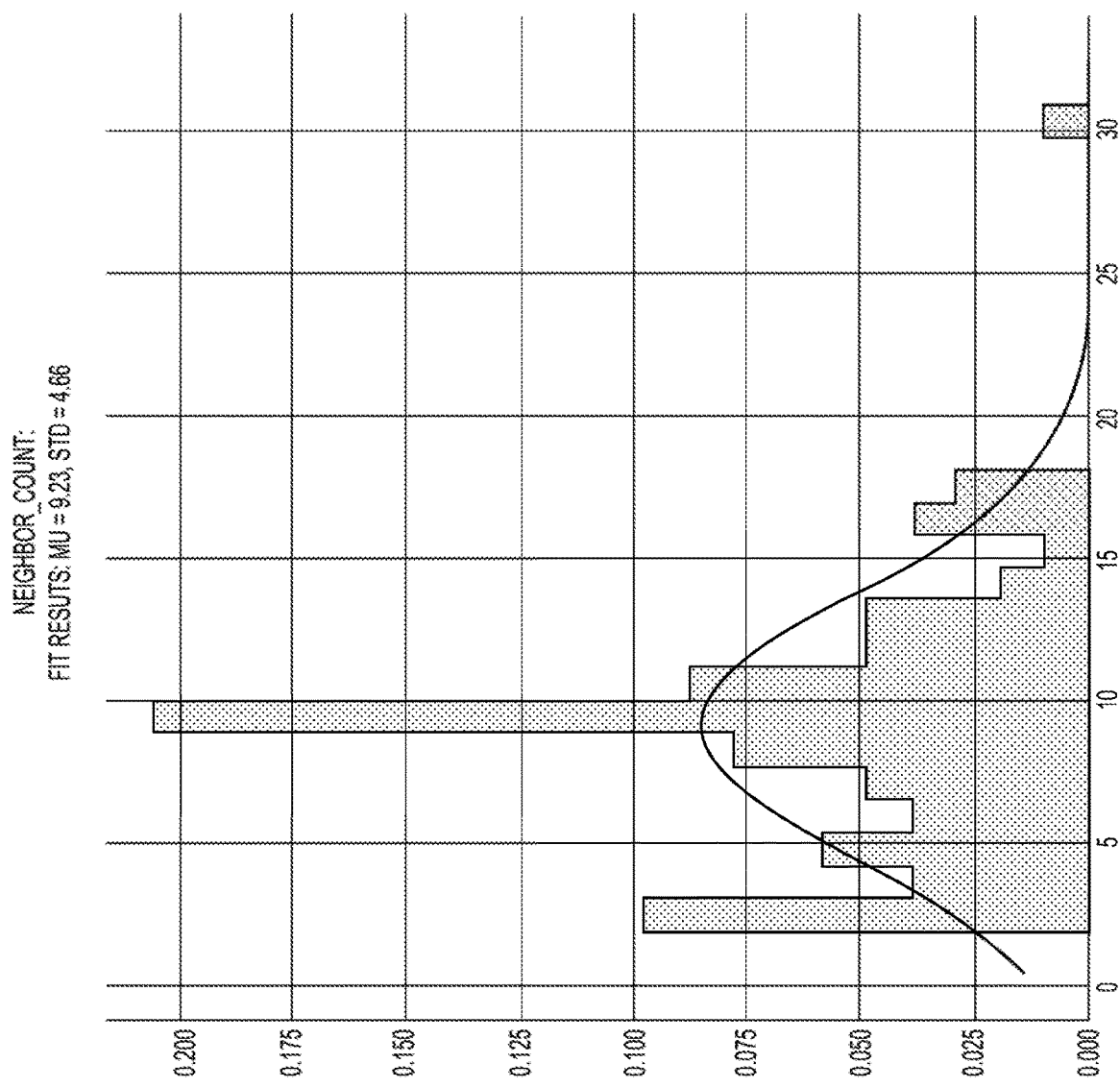
FIG. 11 illustrates a statistical Gaussian curve fit to a select layer three broadcast parameter for a specific PLMN and RAT according to an aspect of the application.

From the indexed data, information corresponding to key network parameters is extracted. The statistical algorithm fits statistically derived distribution curves to the extracted network parameters for BSRs within the same RAT and PLMN. Based upon the fit curves, the mean and standard deviation of the data within each category are determined. FIG. 11 illustrates an exemplary, statistically fit curve.

According to the statistically derived approach in this application, potential RBSRs are detected based upon the number of standard deviations a BSR's value associated with a given parameter/predetermined criteria is located from the calculated mean for that parameter in the PLMN and RAT specific to the BSR (survey data). The calculated mean and associated standard deviation are given by the fit Gaussian curve illustrated in FIG. 11.

The statistical approach to RBSR detection and identification also checks to ensure that the value associated with a given parameter varies in the rogue direction (e.g., statistically significant low neighbor count, statistically significant high cell reselect order) versus the non-rogue direction (e.g., statistically significant high neighbor count, statistically significant low cell reselect order). Upon detection of a potential RBSR, the application alerts subscribed users based on a variety of configurable notification options, such as push alerts to a browser, text, or email.

Once the threshold has been met (e.g., the number of standard deviations have met the threshold), a value for the predetermined criteria is factored in to determine the likelihood that a specific BSR is an RBSR. The criteria may include, though is not limited to, known variables for valid PLMN codes, RATs, and bands for a given region. As specified by the system settings, each network parameter has an associated voting weight indicating how likely a BSR is an RBSR in the case that the threshold associated with the parameter is exceeded by the decoded broadcast data associated with a given BSR). The threshold number of standard deviations for each network parameter, specified by the system settings, can vary and need not be set to the same number of standard deviations from the mean for all network parameters of interest in the application. This allows more sensitivity to variation in certain categories while being less sensitive to variations in other categories. This statistical algorithm concatenates each category in which a given potential RBSR varies beyond the threshold number of standard deviations, and the list can be used to calculate the final confidence percentage. The voting weights for each exceeded network parameter threshold are summed together to calculate the final confidence percentage, which corresponds to the calculated confidence that the potential RBSR is, in fact, rogue. This final confidence percentage, calculated from the statistical algorithm, can be presented to the user for each potential RBSR.

Figure 12:
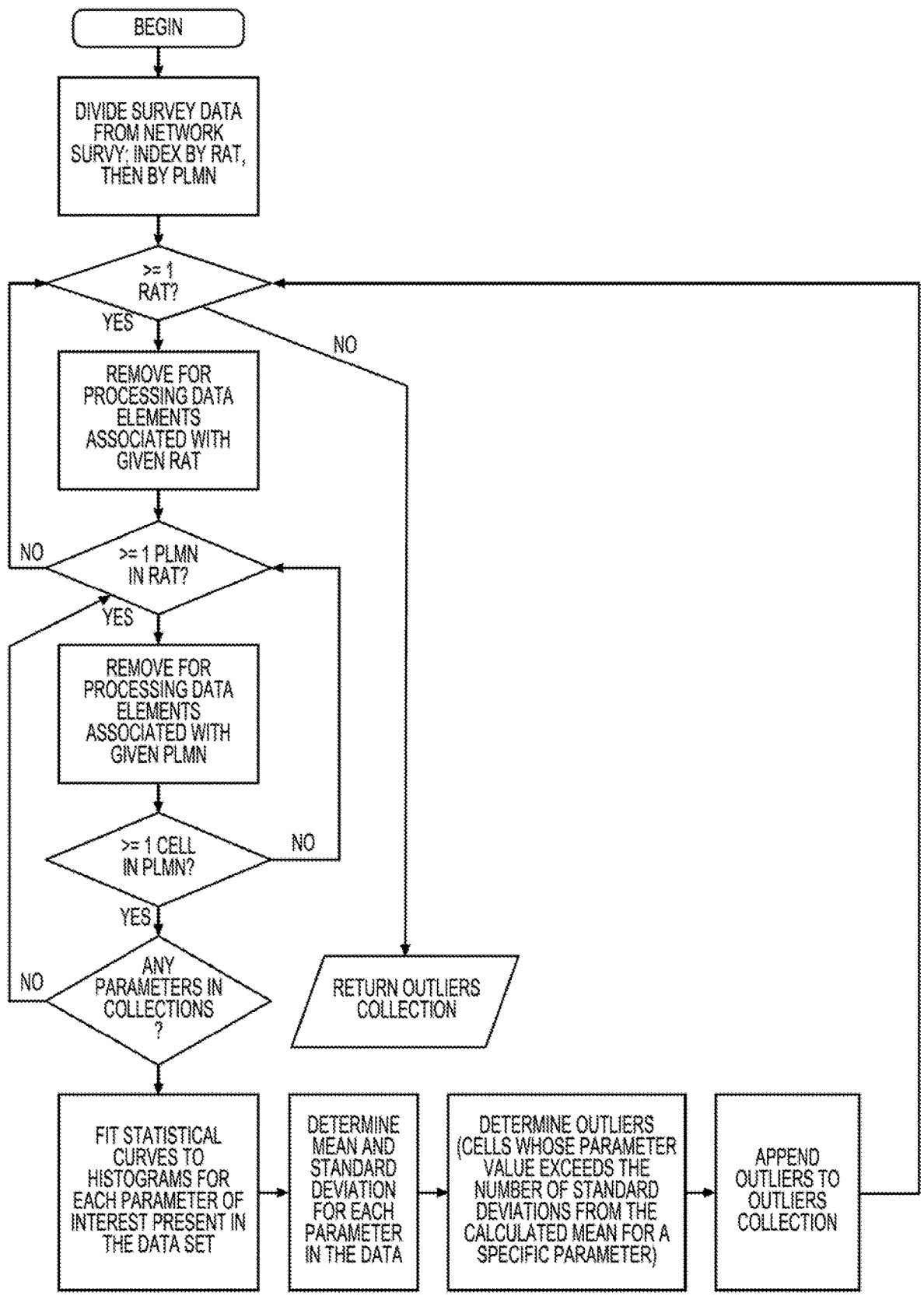
FIG. 12 illustrates a statistical algorithm according to an aspect of the application.

FIG. 12 illustrates an exemplary flowchart of the statistical algorithm. As an initial step, the survey data is separated from the network survey. The data is then indexed by RAT followed by PLMN. A query is made to determine whether there is greater than or equal to one RAT represented in the survey data. If the answer is 'no', the algorithm returns a collection of outliers. If the answer is 'yes', data elements associated with a given RAT are removed for processing. Subsequently, a query is made whether one or more PLMNs in the specified RAT is present for a given iteration. If the answer is 'no', the algorithm returns back to the query to determine whether there is greater than or equal to one RAT represented in the survey data. If the answer is 'yes', data elements associated with the given PLMN are removed from the survey data for processing.

Next, the algorithm proceeds to the query regarding whether there are one or more cells in the PLMN. If the answer is 'no', the algorithm proceeds back to the earlier query regarding whether there are one or more PLMNs remaining in the RAT. If the answer is 'yes', a query is made to determine if any parameters exist in the collection data set that correspond to parameters of interest. If the answer to this query is 'no', the algorithm returns to the query regarding whether there is greater than or equal to one PLMN in the RAT for survey data within a different PLMN within a specified RAT. If the answer is 'yes', a processor executes instructions to produce statistically derived distribution curves fit to histograms for each parameter of interest in the collection data set. Thereafter, the mean and standard deviation are determined for each parameter in the data. Based on the determined means and standard deviations, outliers are determined. In an embodiment, the outliers includes cells associated with one or more parameter values that exceed the threshold number of standard deviations from the calculated mean for the respective parameter. The determined outliers are appended to the outliers collection. The algorithm is repeated until there are no RATs still represented in the survey data. At such time, the outliers collection is returned.

In yet another aspect of the application, the RBSR detection and identification application can automatically run at the end of a cellular survey. It can also be put into a continuous survey mode. The results may be displayed and updated in real-time.

Figure 13:
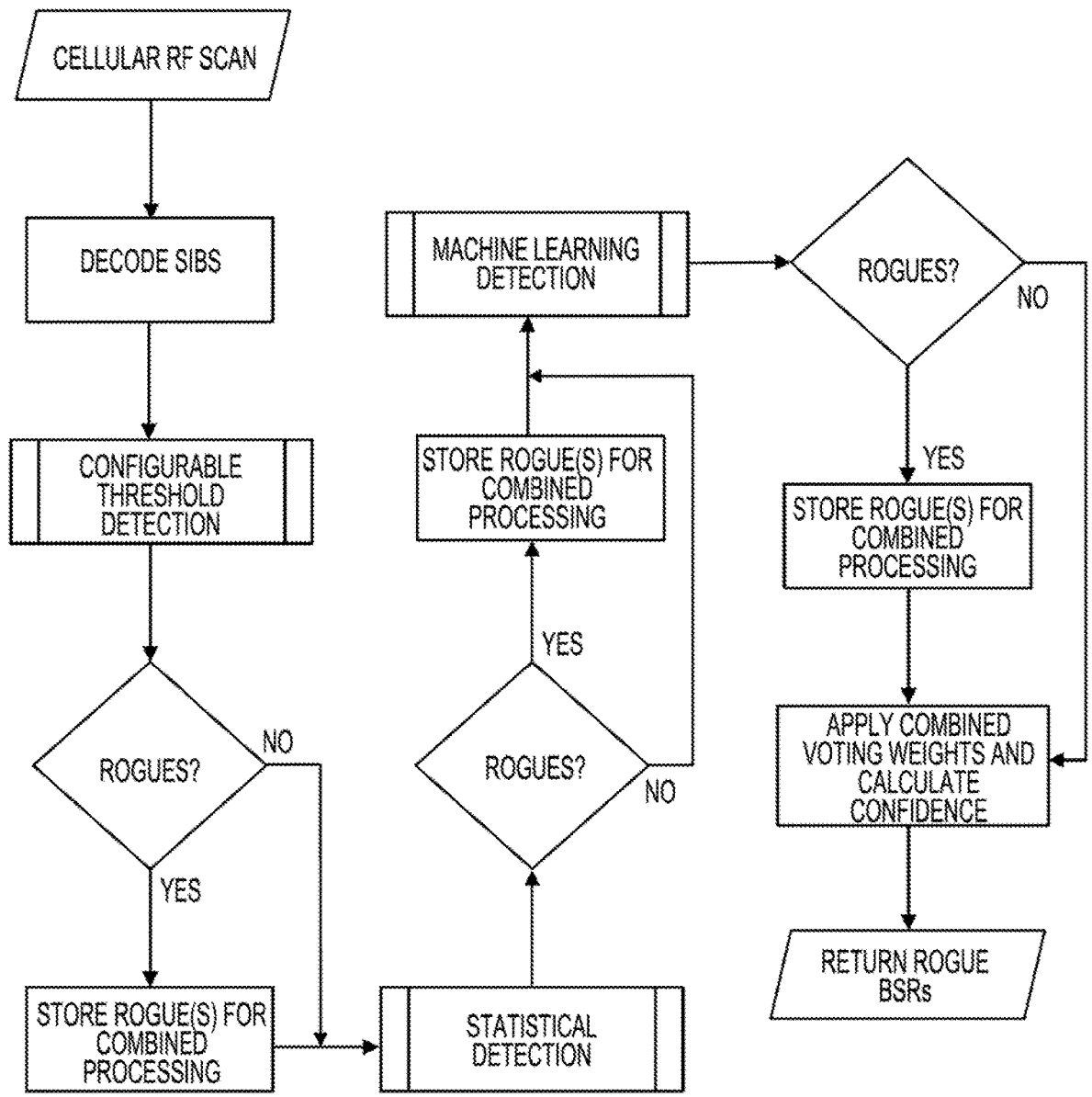
FIG. 13 illustrates a flowchart corresponding to a complete RBSR detection and identification approach according to an aspect of the application.

FIG. 13 illustrates an all-encompassing RBSR detection and identification system, which includes a weighted result of the confidence threshold query for the procedural, statistical, and machine learning algorithms. The order of the three algorithms is arbitrary. The purpose of the combined voting weights from the three algorithms is to provide a more accurate confidence level for determining that a BSR/cellular tower is rogue. Employing one or more of the algorithms, either individually or collectively, is useful when one of the algorithms cannot effectively execute without broadcast information from multiple BSRs. For example, statistical and machine learning algorithms typically need broadcast information from multiple BSRs to make determinations of what is distinguish a normal BSR configuration from an outlier BSR configuration. In such instances, the procedural algorithm is useful.

While the system and method have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present disclosure includes any and all embodiments of the following claims.

What is claimed is:

1. A method for detecting a rogue device in a network comprising:
providing an algorithm including predetermined criteria, executed by a processor, for identifying the rogue device;
performing a cellular scan across the network;
receiving, from the cellular scan, survey data including information of plural devices associated with the predetermined criteria;
displaying, via a graphical user interface (GUI), a distribution curve including a calculated mean and a calculated standard deviation based on the survey data corresponding to the predetermined criteria;
comparing the information of one device of the plural devices with the distribution curve;
determining that the compared information of the one device exceeds a predetermined threshold of standard deviations from the calculated mean; and
based on determining that the compared information of the one device exceeds the predetermined threshold, calculating a confidence level that the one device is the rogue device.

2. The method of claim 1, wherein the survey data is decoded layer 3 broadcast channel data.

3. The method of claim 1, wherein the predetermined criteria is selected from a global cell identifier (GCI), radio access technology (RAT), public land mobile network (PLMN), channel code, bands, signal strength, first and last seen on the network, and combinations thereof.

4. The method of claim 3, wherein the distribution curve is based on one of the predetermined criteria.

5. The method of claim 1, wherein the cellular scan is based on a single scan of the network.

6. The method of claim 1, further comprising:
checking the compared information of the predetermined criteria related to a lower neighbor count and higher cell reselect order.

7. The method of claim 1, wherein the calculating step includes determining a voting weight for the predetermined criteria that corresponds to the compared information of the one device that exceeds the predetermined threshold.

8. The method of claim 1, further comprising:
notifying users on the network of the rogue device.

9. The method of claim 8, wherein a notification is sent via text, email, browser, or combinations thereof.

10. The method of claim 1, wherein the confidence level is continuously updated in view of repeating the cellular scan.

11. The method of claim 1, wherein the one device is a cellular tower or dynamic base station router.

12. The method of claim 1, further comprising:
displaying, on the GUI a list of the plural devices in the network each with an associated confidence level.

13. The method of claim 12, further comprising:
displaying, on the GUI, a time of a first or last occurrence of the rogue device in the network; and
notifying users of the rogue device.

* * * * *